United States Patent [19]
Biddison

[11] 3,713,209
[45] Jan. 30, 1973

[54] AUTOMATIC ARMATURE WINDING

[75] Inventor: John M. Biddison, Dayton, Ohio

[73] Assignee: The Globe Tool and Engineering Co., Dayton, Ohio

[22] Filed: Dec. 14, 1970

[21] Appl. No.: 97,488

Related U.S. Application Data

[63] Continuation-in-part of Ser. No. 67,759, Aug. 28, 1970, abandoned.

[52] U.S. Cl.............29/597, 29/598, 29/205 R, 205/205 CM, 242/7.03, 242/7.05 B, 310/234
[51] Int. Cl. .............................................H01r 43/00
[58] Field of Search........................29/596, 597, 598, 205 C, 205 CM, 29/205 R; 310/234; 242/7.05 B, 7.05 C, 7.05 R, 7.03

[56] References Cited

UNITED STATES PATENTS

| | | | |
|---|---|---|---|
| 3,628,229 | 12/1971 | Biddison et al. | 29/597 X |
| 2,779,886 | 1/1957 | Hunsdorf | 242/7.05 R X |
| 3,163,921 | 1/1965 | Applegate | 242/7.05 R X |
| 3,585,716 | 6/1971 | Steinke | 29/597 |

Primary Examiner—Charles W. Lanham
Assistant Examiner—Carl E. Hall
Attorney—Dybvig & Dybvig

[57] ABSTRACT

The connecting wires between armatures wound by an automatic armature winding machine are clamped closely adjacent the commutator tangs with the finish wires hooked to the tangs of the wound armatures and the start wires looped about selected tangs of the armatures about to be wound. The clamped wire portions are severed at the end of the winding of a wound armature and then after the looping of the start wires about the tangs of the armature to be wound. The wire wasted is limited to the short, clamped wire portions. Also disclosed are two embodiments of double flier armature winding machines for winding armatures in accordance with the invention.

26 Claims, 31 Drawing Figures

INVENTOR.
JOHN M. BIDDISON
BY
HIS ATTORNEYS

INVENTOR.
JOHN M. BIDDISON
BY
HIS ATTORNEYS

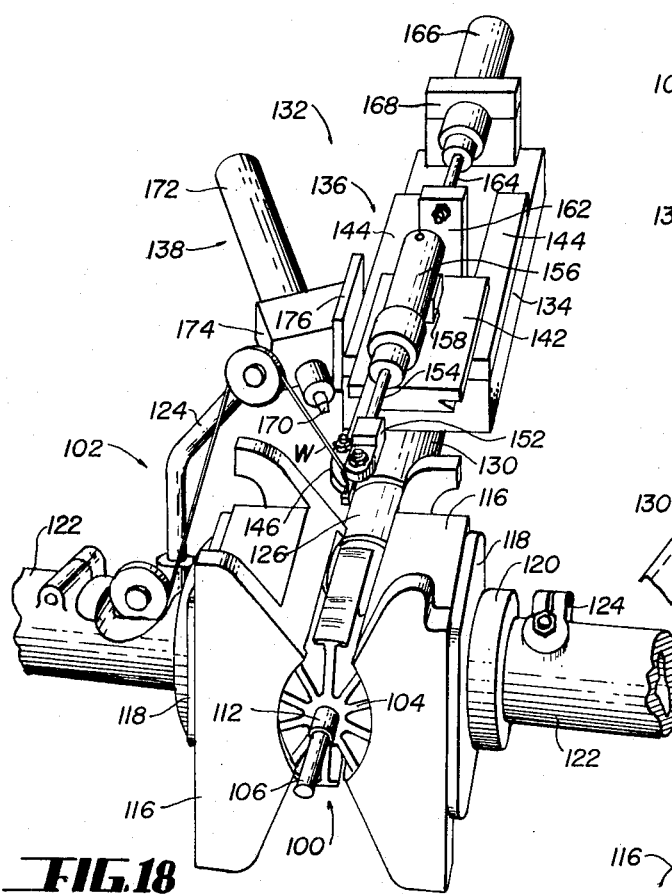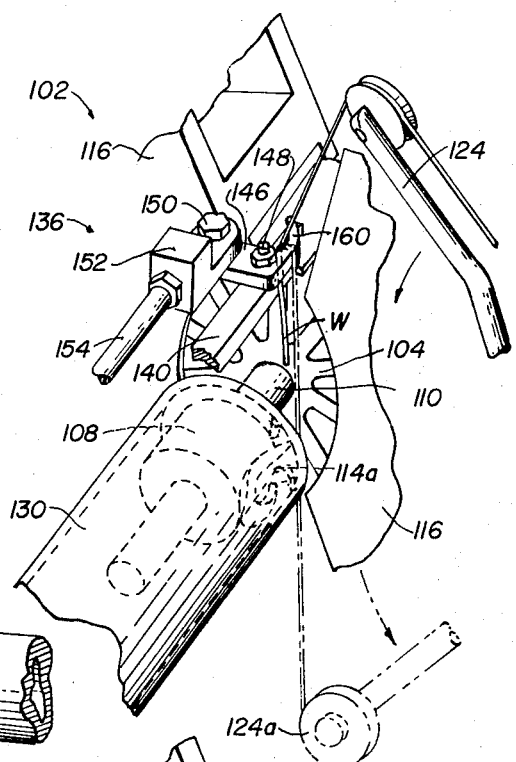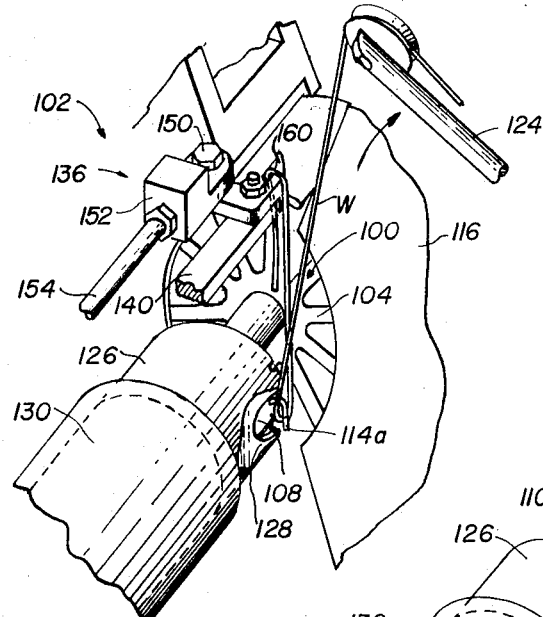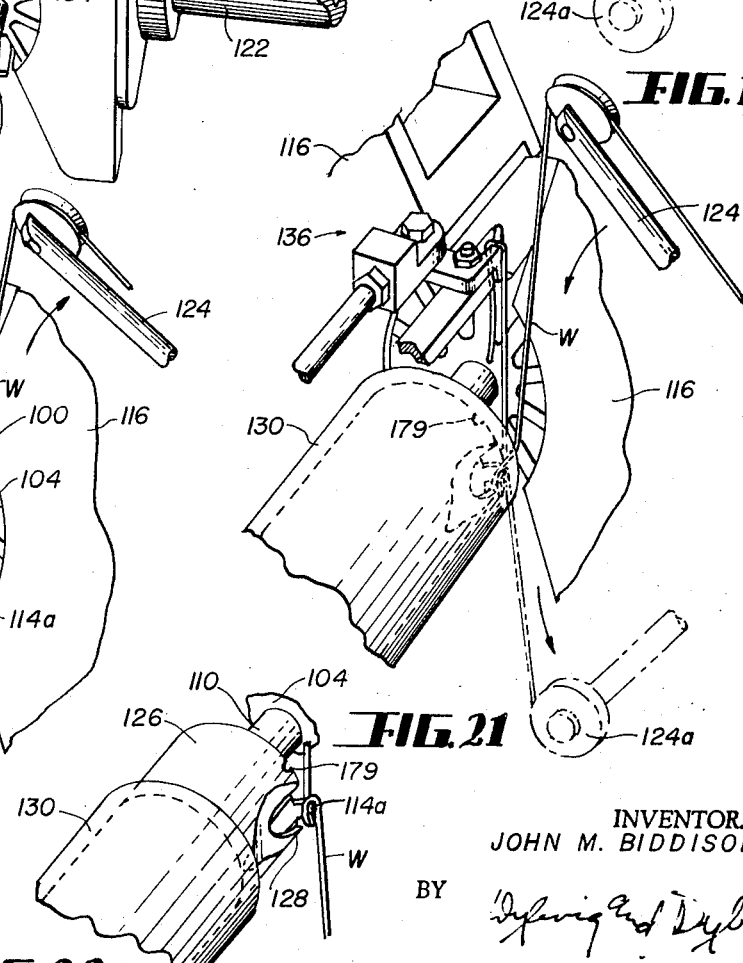

INVENTOR
JOHN M. BIDDISON

BY

HIS ATTORNEYS

AUTOMATIC ARMATURE WINDING

CROSS REFERENCE TO RELATED APPLICATION

This application is a continuation-in-part of my copending application Ser. No. 67,759, filed in the United States Patent Office on Aug. 28, 1970, now abandoned, and titled "Automatic Armature Winding Method."

BACKGROUND OF THE INVENTION

This invention relates to automatic armature winding and more particularly to a method and apparatus for reducing wasted lengths of wire between successively wound armatures.

Fully automatic machines for winding armatures include mechanism for automatically loading an unwound armature at a winding station and mechanism for unloading the fully wound armature from the winding station. Machines known as double flier armature winding machines have a pair of fliers which rotate to wind coils into the armature slots at the winding station. When winding armatures having commutators with tangs or hooks, the lead wire connections from the coils to the tangs are at least partially completed by coursing the lead wires over the tangs. It has been the practice to remove a wound armature from the winding station of a double flier armature winder before cutting the wires free from the fliers. Accordingly, elongate wire strands, termed "connecting wire portions" herein, extend between the wound armature and the fliers. The connecting wire portions are typically cut after the commencement of the subsequent winding of an unwound armature. They are usually cut in one place at this time and at some later stage in the handling of the armatures the connecting wires are trimmed. The trimming involves the further cutting of ends of wires, called "start wires," leading to one end of the armature and also the cutting of other ends of wires, called "finish wires," leading from the other end of the armature. To temporarily hold the finish wires coursed about the appropriate commutator tangs, partial loops or coils are formed by the finish wires to hook them about the armature teeth, these partial loops or coils being removed when the finish wires are later trimmed.

Other methods for cutting the connecting wire portions between armatures have resulted in less wasted wire. One such method is shown in a co-pending application titled Automatic Armature Winding filed by Otto F. Steinke in the U.S. Patent Office on Aug. 1, 1968, Ser. No. 749,381. The Steinke application is assigned to the same assignee as the instant application. The method disclosed in the aforementioned application includes the cutting of the connecting wire portions simultaneously at two places, one closely adjacent the commutator of the wound armature and the other closely adjacent the opposite end of the armature shaft of the unwound armature.

Still another method is shown in a co-pending application titled Automatic Armature Winding filed by John M. Biddison and Clarence William Donnaker in the U.S. Patent Office on Apr. 1, 1969, Serial No. 812,258. This application is also assigned to the same assignee as the instant application. The latter method also involves the cutting of connecting wires at spaced points but further reduces the amount of wasted wire and somewhat simplifies the subsequent handling of the wound armatures because the finish wires are cut closely adjacent to the commutator tangs.

In the methods shown in both of the foregoing applications, the wound armatures are removed from a winding station and replaced at the winding station by unwound armatures before the connecting wires are cut. Of necessity, therefore, there is a considerable length of wasted wire between the wound and the unwound armatures and there are also electrically useless lengths of start wires extending through a pair of spaced slots in the unwound armature. By virtue of the manner in which the start wires are handled in the methods described in the foregoing applications, they are normally wound under the electrically active coils and do not interfere with the operation or the subsequent handling of the armature. On occasion, however, they might require some special handling.

SUMMARY OF THE INVENTION

It is an object of this invention to further reduce the amount of wasted wire in the automatic winding of armatures and to simplify the winding and subsequent handling of automatically wound armatures. In accordance with this invention the finish wire leading from the last coil wound in an armature is cut therefrom prior to removal of the armature from the winding station. The finish wire is so handled that it is temporarily secured to a commutator tang and no further cutting of the finish wire is necessary. During the cutting interval the wire portion leading from the wound armature to the flier is clamped. After the wound armature is cut free it is replaced by an unwound armature. A start wire is then looped about the appropriate commutator tang and the clamped wire portion cut free from the start wire. The clamped wire portion may only be on the order of half an inch long. This short piece of wire is discarded. Because the start wire is looped about a commutator tang, the winding of the armature can progress and no further cutting away of the start wire is required. As a result of this invention, the only lengths of wire wasted between armatures are the short clamped wire portions and the completed armatures do not have any lengths of electrically useless wires in their slots. As will be appreciated by those familiar with the art, the wound armatures may be moved directly from the winding station to a staking station at which time the start and finish wires are permanently attached to the commutator segments.

A further object of this invention is to provide a method which can be practiced by basically conventional armature winding machines and it is an object of this invention to provide winding machines for practicing the method. For this purpose two embodiments of the method and double flier armature winding machines for use in the practice thereof are described. The portions of the machines provided by this invention are designated to not interfere with the other functions of the machines.

Other objects and advantages will become apparent from the following description and the drawings.

BRIEF DESCRIPTION OF THE DRAWINGS

FIG. 2 further schematically illustrates a clamp and cutter mechanism of a type which may be used with this invention and shows parts after being moved from the positions thereof shown in FIG. 1.

FIG. 18 is a front perspective view of a portion of an armature winding machine in accordance with a second, and presently preferred, embodiment of this invention with an unwound armature and with parts positioned in preparation for the hooking of start wires about selected tangs. In FIG. 18 and the remaining FIGS. described below, the parts provided by this invention for use with only one of the two fliers of the winding machine are illustrated.

FIG. 19 is a rear perspective view of the machine of FIG. 18 and illustrating by phantom lines the next step in the operation of the armature winding machine subsequent to that illustrated in FIG. 18.

FIGS. 20 and 21 are perspective views of the same portion of the machine shown in FIG. 19 but illustrating further steps in the operating sequence thereof.

FIG. 22 is a perspective view of a portion of the apparatus as illustrated in FIGS. 19-21 at a still later time in the operating sequence thereof.

DESCRIPTION OF THE PREFERRED EMBODIMENTS

Figure 1:
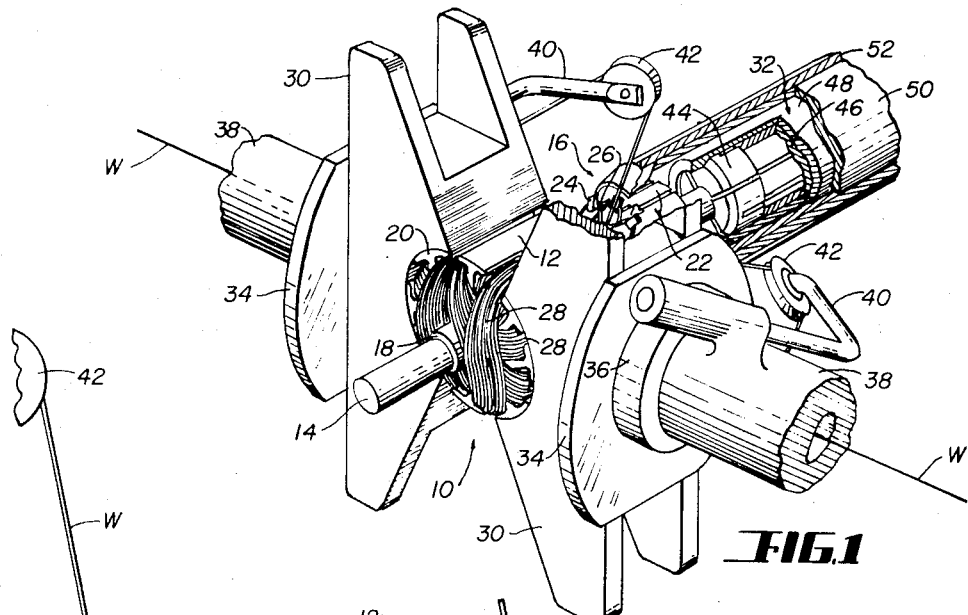
FIG. 1 is a perspective view of a portion of an armature winding machine of the type which may be used in the practice of this invention with an armature which has been fully wound with coils and with parts positioned in preparation for the hooking of the finish wires about selected tangs and the severing of the finish wires therefrom in accordance with this invention.

Referring to FIG. 1, an armature, generally designated 10, is illustrated at the winding station of an armature winding machine. The armature 10 includes a laminated armature core 12 mounted on an armature shaft 14 upon which a commutator 16 is also mounted. Between the armature core 12 and the commutator 16 is an insulating sleeve (not shown) overlying the shaft 14. Another insulating sleeve 18 projects from an insulating end lamination 20 on the end of the shaft 14 opposite from the commutator 16. The commutator 16 is of the type having a plurality of peripherally spaced mutually insulated segments 22 which hooks or tangs 24 at the end thereof adjacent and confronting the armature core 12. The tangs 24 are adapted to receive lead wires 26 extending between adjacent coils, designated 28. In FIG. 1 the armature 10 has been wound with a plurality of coils 28 and there is a lead wire 26 hooked over a tang between each of the coils wound.

Figures 2, 4:
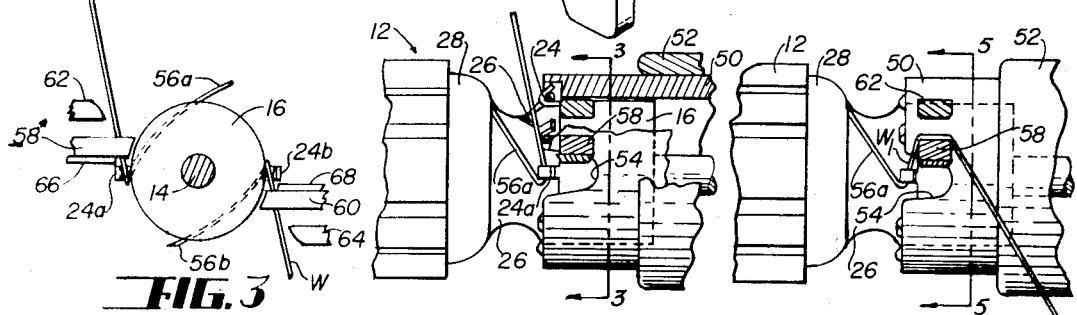
FIG. 2 is a side elevational view, partly in cross section, of a portion of the armature and a portion of the apparatus shown in FIG. 1. The coil windings and lead wires are shown schematically.
FIG. 4 is a side elevational view similar to FIG. 2 showing a further step in the method of this invention. Some of the parts shown in cross section in FIG. 2 are shown in full in FIG. 4.
Figure 3:
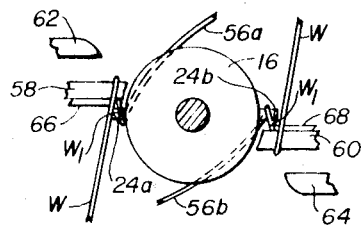
FIG. 3 is a cross sectional view taken along line 3—3 of FIG. 2 but showing only a schematically illustrated portion of the armature, the wire, and the clamp and cutter mechanism.

As known to those familiar with the art, the "start" wires for the first pair of coils to be wound and the "finish" wires leading from the last pair of coils wound, are connected to the same pair of tangs. In FIG. 3, and in other FIGS., the tangs about which the start and finish wires are connected are designated by reference characters 24a and 24b. To avoid confusion of lines in the drawing, the connections of the start wires to the tangs 24a and 24b are not illustrated in FIGS. 1 through 7. Also, the coils 28 and lead wires 26 between coils are only schematically shown in FIGS. 2, 4 and 6.

Generally speaking, this invention relates to a method and apparatus of handling the wires from which the coils are formed starting from the time at which an armature such as the armature 10 has been wound as fully as indicated in FIG. 1 until the time that coils are first wound in an unwound armature which replaces the armature 10 at the winding station. This invention is especially adapted for use with double flier armature winding machines although, as will become apparent, it can equally well be practiced with single flier armature winding machines.

A portion of a double flier winding machine is shown in FIG. 1 and includes a pair of wire guide wings or winding forms 30, the armature 10 being supported partly by the concavely curved surfaces of the wire guide wings 30 and partly by a chuck assembly generally designated 32 clamped to the end of the armature shaft 14 adjacent the commutator 16. The wire guide wings 30 are mounted upon mounting plates 34 which have bearing housings 36 thereon that rotatably receive flier spindles 38 upon which are affixed fliers 40. The wires, designated W, for winding the coils 28 in the slots of the armature core 12 are coursed through the flier spindles 38 and around wire guide pulleys 42 on the fliers 40.

The chuck assembly 32 includes a collet 44 which grips the armature shaft 14 in response to movement of a generally tubular collet actuator 46 that may be driven by a collet operator shaft (not shown). The collet 44 and the actuator 46 are at least partially surrounded by a collet retainer 48 which holds the collet 44 and against which the collet actuator 46 is urged when moved to the left as viewed in FIG. 1.

Mounted in surrounding relation to the collet retainer 48 is a first tubular sleeve 50 which in turn is surrounded by a second tubular sleeve 52. As shown best in FIGS. 2 and 4, the first sleeve 50 constituted a fixed tang shield and has a forwardly extending flange portion overlying all but two of the tangs 24. In order to exposed these two tangs, the front edge of the fixed shield 50 has diametrically opposed, rearwardly extending notches 54 therein, only one of which can be seen in the drawing. The tangs exposed by the notches 54 in the fixed sleeve or shield 50 are in the paths which the wires follow when coils are wound in the armature core slots. For this reason, the second sleeve 52 is a movable tang shield which is extended axially forwardly, that is toward the armature core 12, in surrounding relation to the commutator 16 and all of the tangs 24 as the coils are being wound. Accordingly, the edge of the shield 52 confronting the core 12 guides the wires leading to the pulleys over the front of the commutator 16.

The armature winding machine partially illustrated in FIG. 1 may be of the type shown in the application of John M. Biddison and Otto F. Steinke, titled Armature Winding, Ser. No. 746,863, filed in the U.S. Patent Office on July 23, 1968. Those familiar with armature winders are aware that not all armature winding machines have a chuck assembly such as that designated 32 for gripping the end of the armature shaft adjacent the commutator. In other machines the armature is gripped by other means such as by the wire guides or winding forms 30. The chuck assembly 32 is unnecessary in the practice of this invention and it will be understood that such other machines could be used. For the purposes of this invention, the winding pattern and the nature of the wire leads to the tangs between coils (except for the tangs 24a and 24b) is unimportant, except that the invention is most efficiently practiced when the coils are wound from two strands of wire W and the lead wires connected to the tangs by combined rotary movements of the fliers and rotary or indexing movements of the armature 10.

Although some form of tang shielding device is needed to avoid the hooking of wires to the tangs at the wrong times, shielding means different from the shields or sleeves 50 and 52 may be used. For example, the shield 50 could be rotatably mounted about the axis of the armature shaft and automatically rotatably driven by any suitable means, such as an air operated rack and pinion device. In operation the shield 50 would be rotated to position the notches 54 out of the paths of the wires W leading from the armature to the flier pulleys 42. Then when the tangs 24a and 24b are to be unshielded, the shield 50 could be rotated to position the notches 54 over the tangs 24a and 24b. The outer shield 52 would therefore be unnecessary. In some circumstances, the use of a single, rotatable sleeve or shield may be preferable to two shields 50 and 52.

In the following description, the operation of two shield arrangements illustrated in the drawings is described. However, the corresponding operation of a single rotatable shield device will be obvious. Thus, whenever tangs are to be shielded, the single shield is positioned with its notches out of the wire paths; whenever the tangs are to be exposed, the shield is rotated to a position wherein its notches are located over the tangs. These two positions can conveniently be arrived at by 90° rotations of the inner shield, the notches being horizontally aligned when exposing the tangs and vertically aligned when shielding the tangs.

When used to wind coils, the right hand flier 40 may rotate in a generally clockwise direction as viewed in FIG. 1. The left hand flier 40 would, accordingly, rotate in a generally counterclockwise direction as viewed in FIG. 1. In the following description, the direction through which a flier rotates to wind a coil is called the "forward" direction. When the fliers 40 rotate in their forward directions, the wires W are drawn from spools (not shown) which normally have dereeling devices (also not shown) for placing the wires under tension. The ends of the wires extending from the pulleys 42 to the armatures being wound must be reasonably firmly attached as the fliers 40 begin to rotate to wind coils. After the winding of the coils has begun, the turns of wire in the coils assist in maintaining the tension on the wires W. In the past it has been conventional to clamp the free ends of the wires W to clamp mechanisms located adjacent the winding forms 30. These clamp mechanisms frequently have cutters associated therewith for cutting the wound armatures free from the wires. One type of clamp and cutter mechanism generally indicated by the reference character 52 in the aforementioned Biddison and Steinke application, Ser. No. 746,863. Other more elaborate clamp and cutter mechanisms are shown in the aforementioned applications, Ser. No. 812,258 and Serial No. 749,381.

In accordance with this invention, the free ends of the wires at the beginning of the winding of an armature are first looped about the tangs 24a and 24b. The manner in which they are so looped is described in detail below, with reference to FIGS. 8 through 15. The looping of these wire portions, which are called "start wires," is sufficient to maintain the proper tension on the wires W so that the winding of the coils can commence. The fliers 40 are then rotated to wind the first pair of coils in pairs of spaced armature core slots. At the termination of the winding of the first pairs of coils, portions of the wires are connected to a pair of tangs 24, these portions being the lead wires 26, and the second pairs of coils are then wound.

As previously noted, the armature in FIG. 1 has been provided with a full complement of coils and the parts are positioned in preparation for the attaching of the wire portions leading from the last pair of coils, these portions being the "finish wires," to the tangs 24a and 24b. At this time, the fliers 40 are stopped in positions termed, for convenience herein, "first stop" positions. The fliers are shown stopped at the first stop position in FIG. 1, the right hand flier 40 (as viewed in FIG. 1) being located adjacent the commutator 16 and below the centerline of the armature shaft 14. If the right hand flier 40 rotated in a counterclockwise direction to wind coils, the first stop position would be adjacent the commutator 16 but above the centerline of the commutator shaft 14. Such is the first stop position of the left hand flier 40 shown in FIG. 1. The wires extend from the last coils wound across the front faces of the commutator tangs 24a and 24b to the flier pulleys 42.

In accordance with this invention, the finish wires, which are designated 56a and 56b, are connected to the tangs 24a and 24b, respectively, in the following manner. After all of the coils 28 are wound and the fliers 40 have reached their first stop positions, the movable shield 52 is retracted away from the armature core 12 to expose the tangs 24a and 24b and the fliers 40 are rotated in a reverse direction to hook the finish wires 56a and 56b under the tangs 24a and 24b. After a rotation in the reverse direction on the order of 90°, the fliers 40 are brought to rest at a "second stop" position. The shield 52 and the wires W are thus located as shown in FIGS. 2 and 3. It will be noted that the wires now extend from the last coils wound across the front faces of the tangs 24a and 24b, then across the rear faces of the tangs 24a and 24b to the flier pulleys 42. (As used herein, the front face of a tang is the face confronting the armature core.)

Figure 5:
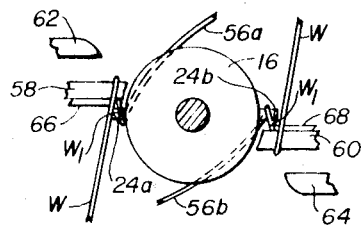
FIG. 5 is a cross sectional view similar to FIG. 3 but taken along line 5—5 of FIG. 4.

After the hooking of the finish wires about the tangs 24a and 24b, the wire strands W leading from the tangs to the fliers 40 are cut away. For this purpose abutments 58 and 60 are placed adjacent the tangs 24a and 24b, respectively, and the fliers 40 rotated in the forward direction to approximately their first stop positions. The abutments 58 and 60 are so located as to prevent the wires from unwinding off the tangs 24a and 24b. Thus, the abutment 58 is vertically positioned between the tang 24a and the right hand flier pulley 42 and horizontally positioned slightly further from the armature core 12 than the bight portion of the tangs 24. The abutment 60 is similarly positioned between the tang 24b and left hand flier pulley 42. During the forward rotation of the fliers 40, the wires remain hooked about the tangs 24a and 24b and are draped over the abutments 58 and 60. The position of the parts is thus as illustrated in FIGS. 4 and 5.

Figure 6:
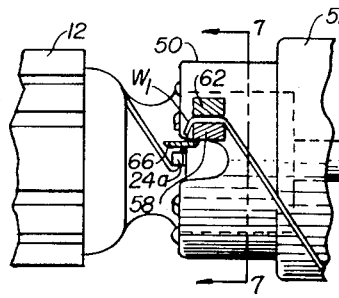
FIGS. 6, 8, 10, 12 and 14 are side elevational views similar to FIG. 4 and respectively showing further steps in the method of this invention.
Figure 7:
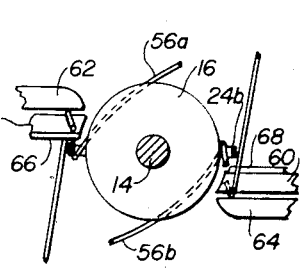
FIGS. 7, 9, 11, 13 and 15 are cross sectional views similar to FIG. 3 taken along lines 7—7, 9—9, 11—11, 13—13 and 15—15 of their respective preceding figures.

At this time in the practice of the method of this invention, the wires leading to the fliers are clamped to the abutments 58 and 60. For this purpose clamps arms 62 and 64 are moved by suitable means (not shown) into clamping engagement with the wire portions draped over the abutments 58 and 60. The clamp arms 62 and 64 may be movably mounted on supports common with the support for the abutments 58 and 60. Accordingly, they are shown adjacent the abutments 58 and 60 in FIGS. 2-5. The small sections of wire, designated $W_1$, between the tangs and the abutments are then severed by cutter blades 66 and 68 advancing toward the armature core 12 and moving in a plane substantially parallel to the longitudinal axis of the armature shaft 14. As the cutter blades 66 and 68 first begin to advance toward the armature core 12 and engage the wire sections $W_1$, they tend to bend the points of the wire with which they are engaged toward the armature core 12. As they continue to move toward the armature core 12 during and after the cutting of the wire sections $W_1$, the severed ends of the finish wires are bent further toward the armature core 12 and around the tangs 24a and 24b. Accordingly, the finish wires for the last coils wound are hooked or partially looped about the tangs 24a and 24b. The position of the parts at the end of the cutting of the wire sections $W_1$ are illustrated in FIGS. 6 and 7. As apparent, the armature 10 is now cut free from the wires leading to the fliers 40 and the winding of the armature 10 is complete. The wound armature 10 may now be removed either manually or automatically for further operations thereon, such as hot staking of the lead wires to the tangs.

Figure 8:
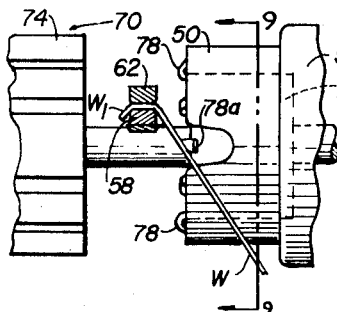
Figure 9:
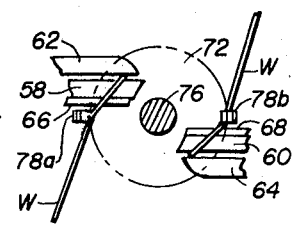

With reference to FIGS. 8-15, after the wound armature 10 is removed, an unwound armature 70 is inserted at the winding station and chucked to the armature winding machine. During this interval the wire strands W leading to the fliers remain clamped to the abutments 58 and 60 by the clamp arms 62 and 64, respectively. The movable tang shield 52 remains retracted and the fliers remain at approximately their first stop positions. At approximately the same time as the unwound armature 70 is chucked at the winding station, the abutments 58 and 60 and the clamp arms 62 and 64 are moved to position the otherwise free ends of the wire strands W between the commutator, designated 72, and the armature core, designated 74, of the unwound armature 70. These parts are also moved immediately adjacent to the shaft, designated 76, of the unwound armature 70. As a result, the wires leading to the flier pulleys 42 extend across the front faces of two selected tangs, designated 78a and 78b, about which the start wires are to be looped. In FIG. 9, the wires W leading to the fliers are shown bent around the edges of the commutator. In practice this may or may not occur to the degree illustrated. At this point it should also be noted that the commutator 72 in FIGS. 9, 11, 13 and 15 is shown in phantom lines and the tangs 78a and 78b shown in full lines in order to more clearly show the looping of the start wires.

If the clamped wire parts are moved after the insertion of the unwound armature 70, the movable shield 52 may be temporarily moved back into covering relation to the tang, designated 78, of the commutator 72 to avoid accidental hooking of the wire strands about any of the tangs, designated 78. In any event, the positions of the parts shown in FIGS. 8 and 9 is reached in preparation for the connection of the start wires to two selected tangs, designated 78a and 78b. The method of this invention then progresses as follows.

Figure 10:
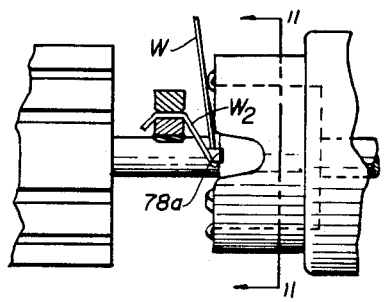
Figure 11:
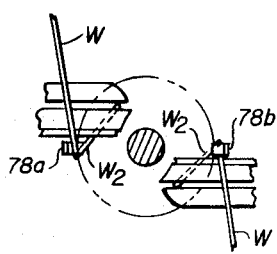
Figure 12:
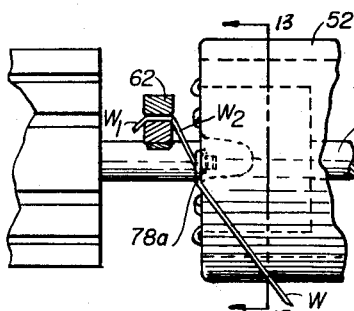
Figure 13:
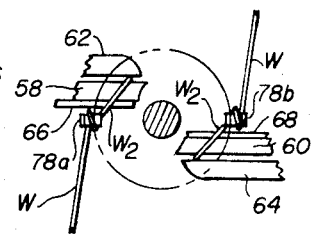

With reference to FIGS. 10 and 11, the fliers are reversely rotated to approximately their second stop position whereupon start wire portions thereof extend from the clamped ends thereof across the front faces of the tangs 78a and 78b and then at an acute angle across the rear faces of the tangs 78a and 78b to the flier pulleys 42, which are not shown in FIGS. 8–15. This movement of the fliers has, accordingly, hooked the wire strands about the tangs 78a and 78b.

After the fliers have again reached approximately their second stop positions, the movable shield 52 is returned to covering relation to the tangs 78. This movement of the movable shield 52 toward the armature core 70 is sufficient to nearly engage or else engage the start wire portions of the wire strands between the tangs 78a and 78b and the flier pulleys.

After the shield 52 is returned to its tang shielding position, the fliers are rotated in a forward direction toward their first stop positions. In the absence of a shield, this forward movement of the fliers would cause the start wires to be unhooked from the tangs 78a and 78b. However, the shield over the tangs 78a and 78b guides the start wire portions about the front surfaces of the tangs 78a and 78b, whereupon, as the fliers approach their first stop positions, the start wires are completely looped about the tangs 78a and 78b. The parts have now reached the positions shown in FIGS. 12 and 13.

At this time it will be observed that there is a short section of wire, designated $W_2$, between each of the abutments 58 and 60 and their associated tangs 78a and 78b. These short sections of wire $W_2$ are severed. As a matter of convenience, opposed surfaces of the same cutter blades 66 and 68 may be used to sever the wire sections $W_2$ that were used to cut the wound armatures free from the wire sections $W_1$. The cutting of the wire sections $W_2$ is preferably accomplished by the blades moving in a direction away from the armature core 74 toward the commutator 72 because the free ends of the cut start wires are thereby bent or formed about the tangs 78a and 78b in the desired direction to more firmly wedge or clamp the start wires thereto.

Figure 14:
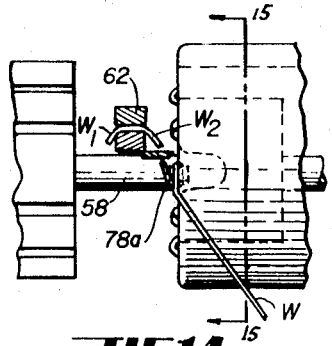
Figure 15:
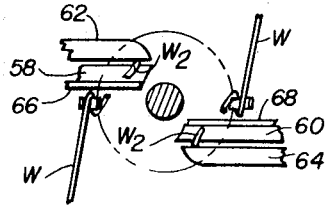

The parts have now reached the positions shown in FIGS. 14 and 15 wherein it will be noted that the small wire sections $W_1$ and $W_2$ remain clamped to the abutments 58 and 60. Depending upon the stiffness of the wire strands W, the cutting of the wire sections $W_2$ may be accomplished during the interval in which the fliers are moving in a forward direction from their second stop positions toward their first stop positions, or, alternatively, the flier pulleys may be again stopped at approximately their first stop positions before the severing of the wire sections $W_2$.

After the parts have reached the position shown in FIGS. 14 and 15, the abutments 58 and 60, the clamp arms 62 and 64, and the cutter blades 66 and 68 are removed from the winding area and the winding of the first pair of coils in the unwound armature can be started by rotation of the fliers in the forward direction. The short wire sections $W_1$ and $W_2$ may be discarded at any time after the start wires are cut therefrom. In a fully automatic winding system, the wires $W_1$ and $W_2$ may be discarded, for example, by removing the clamp arms 62 and 64 and blowing the wire off the abutments 58 and 60.

Again depending upon the stiffness of the wire strands W, it may be desirable to slowly rotate the fliers to wind the first few turns of coils before bringing the fliers to full rotational speed to prevent the looped ends of the start wires from unraveling off of the tangs 78a and 78b. The winding of the armature then proceeds as described above the finish wires are hooked to the tangs 78a and 78b in the manner described with reference to FIGS. 1–7. The type of drive for armature winding machines disclosed in U.S. Pat. No. 3,371,483, issued to Robert C. Gray et al. on Mar. 5, 1968, may be used to control the rotation of the fliers 40 for the purposes of this invention.

As apparent from the foregoing description and the drawings, the objects of this invention have been met. The hooking of the finish wires as described in connection with FIGS. 1–7 should be sufficient to permit subsequent handling of the armatures because there are no forces tending to pull the finish wires from the tangs. The complete looping of the start wires as described in connection with FIGS. 8–15 should also be sufficient to maintain tension on the wires as the first turns of the first coils are wound. In the practice of the method of this invention, only the short sections of wire remaining clamped to the abutments 58 and 60 are wasted. It will be apparent to those skilled in the art that this invention may be incorporated in fully automatic armature winding machine systems wherein the armatures are handled automatically and the operations of the mechanisms described above proceed automatically.

Figure 16:
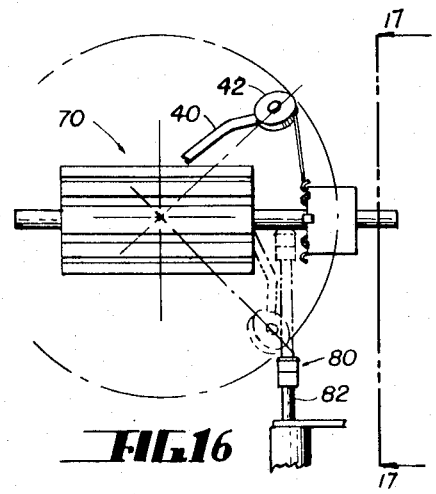
FIG. 16 is a schematic side elevational view depicting the approximate angle of rotation of a flier in carrying out the method of this invention and also showing the approximate location of a clamp and cutter mechanism which may be used in the practice of this invention.
Figure 17:
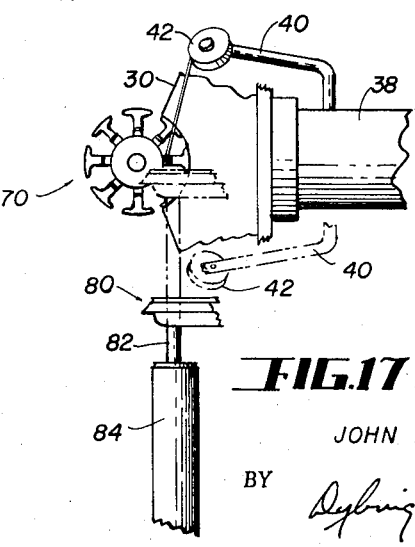
FIG. 17 is a schematic rear elevational view of the elements schematically illustrated in FIG. 16.

With reference to FIGS. 16 and 17, it will be noted that the fliers 40 need only move through an angle on the order of 90°, and in any event considerably less than 180°, between the first and second stop positions thereof. Accordingly, there is adequate space between the armature core 12 and the fliers for inserting clamp and cutter mechanisms to carry out the functions of the abutments 58, 60, the clamp arms 62, 64, and the cutter blades 66 and 68. The right hand clamp and cutter mechanism, generally designated 80, as viewed in FIG. 16, would preferably be mounted upon a shaft 82 that may be a piston for an air actuator 84 and advanced from beneath the centerline of the armature shaft. The left hand clamp and cutter mechanism (not shown) is preferably also mounted upon the shaft 82 in any suitable fashion, or it may be mounted to move downwardly from above the armature shaft 14. After the wire sections $W_1$ and $W_2$ have been severed from the start wire for the unwound armature, the two clamp and cutter mechanisms are retracted away from the winding area to permit the fliers 40 to rotate in the forward direction for the winding of the armature coils.

The specific clamp and cutter mechanism 80 schematically illustrated in FIGS. 16 and 17, especially the cutter blades 66 and 68 thereof, are only indicative of the type of wire cutting apparatus that might be used in the practice of the method of this invention. Double edged cutter blades, such as those designated 66 and 68, moving in a horizontal plane are presently preferred. However, it is apparent that overlapping shear type cutting devices, or cutter blades moving against relatively fixed plates, or other types of cutting devices could be used. It may be possible, for example, to use the abutments 58 and 60 as backup plates against which cutter blades would sever the wire sections. Accordingly, the cutter blades could be completely separate from the clamp arms 62 and 64 or they may be attached thereto. Also it should be apparent that the cutting devices for severing the wire sections $W_1$ and $W_2$ could operate in vertical planes transverse to the armature shaft. Thus, with reference to FIGS. 4 and 6, the abutment 58 illustrated therein could be spaced slightly further from the armature core 12 than illustrated and a vertically upwardly moving cutter blade could be used to cut the wire section $W_1$. Such cutting movement would further bend the cut end of the finish wire 56a about the tang 24a although not to the degree obtained with the horizontally moving cutter blade 66. Either the same or a different cutter blade could be used to sever the wire section $W_2$, it being apparent from an inspection of FIGS. 12 and 14 that a cutter blade again moving vertically upwardly would serve to at least partially bias the severed end of the right hand wire W about the tang 78a.

Those familiar with the difficulties in maintaining control of the wires used in winding armatures will appreciate that control is maintained by keeping the wire taut at aubstantially all, if not all, times between the winding of one armature and the start of the winding of another armature. The wire is held taut by virtue of the clamping of the wires to the abutments 58 and 60 and because of the minimum number of movements undergone by the fliers. Advantageously, the wires are hooked about the tanks 24a and 24b of the wound armature and completely about the tangs 78a and 78b of the unwound armature after only two reverse movements of the fliers and the subsequent movements of the fliers in their forward directions preparatory to the winding of pairs of coils in the unwound armature 70. Since the fliers remain stationary in substantially their first stop positions during the interval in which the wound armature is removed and replaced by an unwound armature, the fliers are appropriately located to commence the looping of the wires about the tangs of the unwound armature before the wound armature is removed. Therefore, the method described above can be accomplished in minimal time.

Referring to FIGS. 18-30, an armature, generally designated 100, is illustrated at the winding station of an armature winding machine, generally designated 102. With reference especially to FIGS. 18 and 19, the armature 100 may be identical to the armatures 10 and 70 and it includes a core 104 on a shaft 106, a commutator 108, an insulating sleeve 110 between the core 104 and the commutator 108, and an insulating sleeve 112 projecting from the opposite end of the core 104. The commutator 108 has plural commutator tangs 114, two of which, designated 114a (FIGS. 19-25 and 27) and 114b (FIGS. 28-30), are adapted to receive the start and finish wires as will be further discussed below.

The armature winding machine 102 is basically the same as the armature winding machine described above and includes a pair of wire guide wings or winding forms 116 mounted upon plates 118 having bearings 120 which rotatably receive flier spindles 122 upon which are affixed fliers 124. The operation of only one of the fliers 124 is described herein, it being apparent that the other of the fliers 124 will undergo essentially the same movements but in opposite directions.

The armature winding machine 102 also includes a collet (not shown) for gripping the armature shaft 106, which may be identical to the collet 44 described above, and a commutator tang shielding arrangement consisting of a first tubular sleeve 126 having notches 128 for exposing the desired tangs 114 and a second movable sleeve or tang shield 130 for shielding all of the tangs 114 including the tangs 114 exposed by the notches 128. The parts of the armature winding machine 102 thus far described may all be identical to the corresponding parts of the armature winding machine described above in connection with FIGS. 1-17.

With continued reference to FIG. 18, a clamp and cutter mechanism generally designated 132 is shown mounted upon a mounting plate 134 that is fixed in relation to the bed of the machine in any suitable fashion. The clamp and cutter mechanism 132 corresponds to but differs from the clamp and cutter mechanism 80 shown above. The clamp and cutter mechanism 132 includes separate wire clamping and cutting devices designated 136 and 138, respectively.

Referring to FIGS. 18-21 and 26, the wire clamping device 136 includes an elongate "fixed" clamp member 140 affixed to a support plate 142 that is slidable in ways 144 upon the mounting plate 134 and further includes a pivotally movable abutment or clamp member 146 which is an L-shaped piece mounted by a pivot pin 148 on top of the fixed clamp member 140. One leg of the pivotal clamp member 146 is fastened by a pivot pin 150 to a fitting 152 at the end of a piston rod 154 driven by a clamp operating air cylinder 156 mounted on a spacer 158 upon the slidable support plate 142. The other leg of the movable clamp member 146 is shaped to form a movable clamp jaw 160 for engaging the wire leading to one of the fliers 124 as will be further described below. Connected to the slidable support plate 142 is an upwardly projecting bracket 162 to which is connected the piston 164 of a clamp positioning air cylinder 166 mounted by a support plate 168 to the fixed mounting plate 134. For reasons discussed below, the slidable support plate 142 and the elements mounted thereon can be advanced toward or retracted from the armature 100 at the winding station by actuation of the air cylinder 166. As can best be seen in FIG. 26, the end of the fixed clamp member 140 nearest the armature 100 may have a reduced width to form a fixed jaw 140a cooperating with the jaw 160 to form a clamp for clamping wire therebetween. As apparent, the pivotal clamp member 146 can be pivoted about the axis of the pivot pin 148 by retraction and extension of the piston rod 154 to cause the clamping jaw 160 to move toward and away from the fixed jaw 140a, thereby effectively opening and closing the clamp formed by the jaws 140a and 160.

The cutting device 138 comprises an elongate cutting rod 170 powered by a cutter drive air cylinder 172 mounted by a bracket 174 to a plate 176 affixed to the mounting plate 134. The end of the cutting rod 170 closest to the armature 100 at the winding station is beveled to a knife edge, designated 178 (see FIGS. 24 and 29). The cutter drive air cylinder 172 is located to the rear of the armature so that when the cutting rod 170 is extended it advances quite close to one of the tangs 114a or 114b and between that tang and an immediately adjacent tang 114.

As previously noted, only one of the clamp and cutter mechanisms 132 is shown in the drawings. It will be appreciated that an identical clamp and cutter mechanism would be mounted beneath the horizontal plane passing through the armature shaft with its cutter mechanism located on the right hand side and the other parts being generally located in mirror image relation to the other parts of the clamp and cutter mechanism 132 illustrated.

The operation of the second embodiment of an armature winding machine is as follows. In FIG. 18 the left hand flier 124 is shown at its "reverse stop" position with the free end of the wire, designated W, clamped between the jaws 140a and 160. At this time in the operation of the machine, the armature 100 has been chucked and appropriately indexed to position it where desired. The support plate 142 for the clamping device 136 has previously been extended forwardly toward the armature core so that the wire is clamped above the armature shaft 106 and generally in the plane of the rear face of the bight portion of the tang 114a. The full line position of the parts shown in FIG. 19 is the same as the position of the parts shown in FIG. 18 except in FIG. 19 the movable shield 130 is advanced into shielding relation with respect to the tangs. With the parts positioned as just described, the illustrated flier 124, which is the left hand flier of FIG. 18, is rotated in the forward direction from its reverse stop position to approximately its forward stop position as indicated by the phantom lines 124a in FIG. 19. Because the tang shield 130 prevents hooking of the wire about the tang 114a, the wire between the clamp jaws and the flier 124a merely extends across the front face of the tang 114a between the commutator 108 and the armature core 104.

Figure 23:
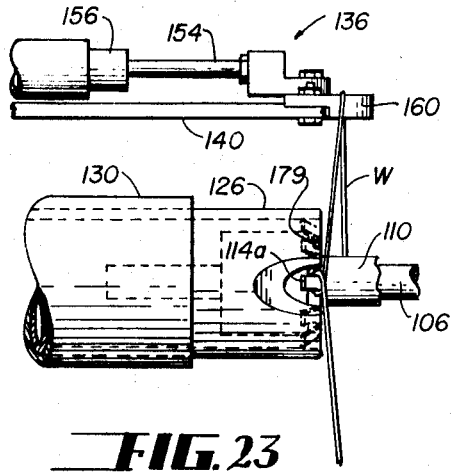
FIG. 23 is a side elevational view of a portion of the apparatus shown in FIG. 18-21 and showing the parts at the same time in the sequence of operation as is illustrated in FIG. 22.

After the flier 124 reaches the position indicated by phantom lines in FIG. 19, the movable tang shield 130 is retracted, thus exposing the tangs 114a and 114b. The flier 124 is rotated in a reverse direction back to its reverse stop position whereupon the wire W is now hooked about the tang 114a as shown in FIG. 20. Subsequently, the movable tang shield 130 is extended into its tang shielding position and, with reference to FIG. 21, the flier is rotated from its reverse stop position to its forward stop position 124a. The portion of the wire leading from the tang 114a to the flier is cammed over the front edge of the tang shield 130 and, accordingly, completely looped about the tang 114a. As shown in FIGS. 22 and 23, the movable tang shield 130 is again retracted in preparation for the cutting of the length of wire between the tang 114a and the clamping device 136. It will be observed in FIG. 22 that the wire W is looped spirally about the tang 114a.

Figure 24:
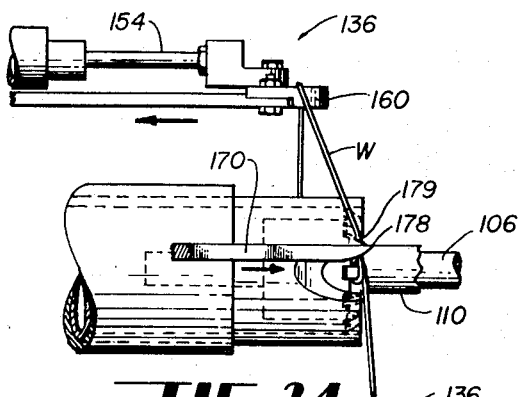
FIG. 24 is a side elevational view similar to FIG. 23 but showing the parts at a later time in the operating sequence and illustrating the manner in which the start wire is severed adjacent the commutator tang.

In FIG. 23 it will be noted that the clamping device 136 remains in its fully extended position with its jaws adjacent the plane containing the front faces of the tangs 114. Some slack may be created when the wire is first pulled over to the fixed jaw 140a by the pivotal jaw 160 as will be described below in connection with FIGS. 28 and 29. Therefore, the clamping device 136 may, if necessary or desirable at this time, be retracted to a mid-position illustrated in FIG. 24 to draw taut the section of the wire between the tang 114a and the clamp jaws. A notch 179 may be cut in front edge of the inner shield 126 for accurately positioning this wire section in preparation for the cutting operation described below. Without the notch 179, the wire might slide uncontrollably along the front edge of the inner shield 126 as the clamping device 136 moves to its mid-position. Of course, there would be two such notches 179, one for each of the wires leading to the two fliers 124. After the clamping device reaches the mid-position of FIG. 24, the wire is cut by actuation of the cutter drive cylinder which advances the cutter rod 170 toward the armature core 104. As can be seen in FIGS. 18 and 24, the cutter rod 170 is angled toward the armature shaft 106 and the beveled portion of the rod 170 is adjacent the top edge of the tang 114a, whereupon the wire is cut and cammed inwardly toward the armature shaft 106 and the armature core 104.

Figure 25:
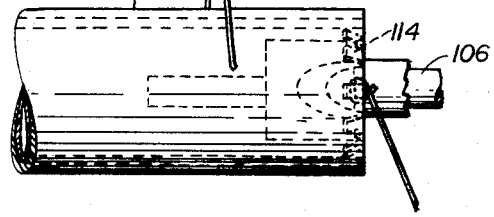
FIG. 25 is a side elevational view similar to FIGS. 23 and 24 but showing the parts subsequent to the cutting of the start wire in preparation for the commencement of winding of coils in the armature core.

After the wire has been cut, the cutter rod 170 is retracted by operation of the cutter drive cylinder 172 and the cutter device 136 is further retracted away from the armature 100 so as to be completely clear of the wires wound into coils by subsequent rotation of the fliers 124. The further retracted position of the cutting device 136 is illustrated in FIG. 25. In FIG. 25 it will be noted also that the shield 130 has been extended so that the fliers 124 may be safely rotated to wind coils without accidentally hooking wire onto any of the tangs 114.

Figure 26:
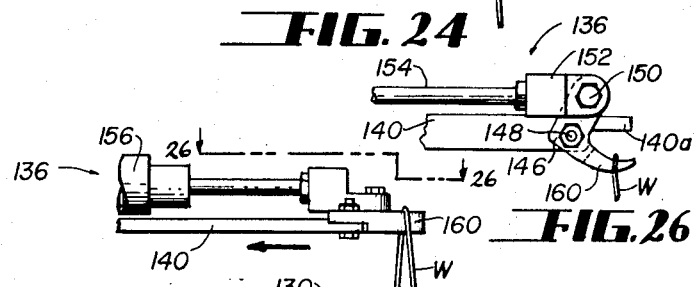
FIG. 26 is a plan view of a portion of a wire clamp viewed in the direction of arrows 26—26 of FIG. 25.

With reference to FIG. 26, the piston rod 154 is extended when the clamping device 136 is moved away from the armature core, whereupon the length of wire cut free and draped over the movable jaw 160 is no longer clamped against the fixed jaw 140a. At this time this short length of waste wire can be ejected in any suitable fashion. In practice it has been found that the wire may simply fall off the jaw 160 or it can be positively removed as by blowing air thereagainst. Optionally the piston rod 154 can immediately thereafter be retracted to close the jaw 160 against the jaw 140a or the jaw 160 can be left in the position shown in FIG. 26 at this time. The position of the jaw 160 during the winding of coils will depend upon whether or not the jaw, if open, would interfere with the winding of coils.

Figure 27:
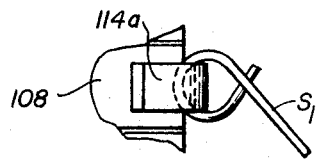
FIG. 27 is a side elevational view of a portion of the commutator and illustrating the wire looped about a tang subsequent to the cutting thereof when the parts have reached the position illustrated in FIG. 25.

FIG. 27 shows in larger scale the resultant connection of the start wire, designated $S_1$, to the tang 114a after the commencement of winding coils in the armature. In practice it has been found that the cut end of the wire loop tends to point down to the armature shaft. The loop is slightly uncoiled as a result of the tension created by the rotation of the fliers 124 when winding coils, but the loop is not fully unwound and an adequate connection between the start wire $S_1$ and the tang 114a is created. Of course, as already mentioned this connection is only temporary in the sense that a permanent connection will be made at a later time, typically by hot staking the commutator tangs 114 and the wire.

During the sequence of operations illustrated and described in connection with FIGS. 18–26, the other clamp and cutter mechanism (not shown) located beneath the armature shaft 106 will be performing the same functions as the clamp and cutter mechanism 132. Accordingly, by the time the loop of wire is formed about the tang 114a, another loop of wire will be formed about the tang 114b and the winding of the first pair of coils can now commence. Depending upon the construction of the armature and the winding pattern to be followed, the armature may be indexed by one slot width about its longitudinal axis and the first pair of coils wound by rotation of the fliers 124. Since the manner in which the coils are wound and the winding patterns to be obtained are unimportant to this invention, the winding of the coils is not described herein. After all coils have been wound the operations described below take place.

Figure 28:
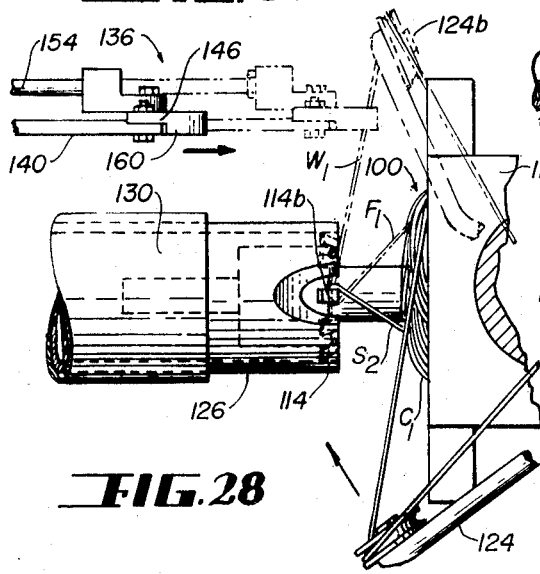
FIG. 28 is a side elevational view of portions of the armature winding machine shown in FIGS. 18–25 and showing the armature after all coils have been wound therein. Phantom lines in FIG. 28 illustrate the finish wire about a tang and engaged by the wire clamp.

FIG. 28 shows the same flier 124 illustrated above, that is the left hand flier 124 as viewed in FIG. 18, in full lines at its forward or first stop position at the end of the winding of the last pair of coils. The armature 100 is now fully wound except that the finish wires have not yet been connected to the tangs 114a and 114b. By the time the parts have reached the position illustrated in FIG. 28, the armature has been rotated through 180° from the position thereof illustrated in FIGS. 18–25. Accordingly, the tang 114b is positioned to receive a finish wire, designated $F_1$. A start wire $S_2$ is shown in FIG. 28 hooked about the tang 114b in a direction opposite to the start wire $S_1$ in FIG. 27. The reason the start wire $S_2$ is looped in the opposite direction is that it was initially formed and cut by the clamp and cutter mechanism cooperating with the right hand flier 124. It will be noted that the wire connections to the commutator between coils, designated $C_1$, are not shown in FIGS. 28 and 29 to more clearly illustrate the start wire $S_1$ and the connection of the finish wire $F_1$ to the tang 114b.

After the stopping of the flier 124 at the first or forward stop position, the movable tang shield 130 is again retracted to expose the tangs 114a and 114b and the fliers 124 then reversed to their stop positions, indicated by phantom lines 124b in FIG. 28. Upon this reverse rotation of the fliers the wire leading from the illustrated flier 124 is caused to follow a path leading from the last armature core slot in which it is positioned to the underside of the commutator tang 114b to form the finish wire $F_1$ and thence along the phantom line path $W_1$ to the flier shown in phantom lines 124b at its reverse stop position. Thereafter the clamping device 136 is moved from its retracted position shown in full lines in FIG. 28 to its extended position shown in phantom lines in FIG. 28. As it is advanced toward the armature core, the movable clamp member 146 is so positioned that its clamp jaw 160 is "open," that is projected away from the fixed clamp jaw 140a.

After the clamping device 136 is fully extended, the clamp operating cylinder 156 is energized to retract its piston rod 154 causing the jaw 160 to be pivoted toward the fixed clamp jaw 140a. At this time the segment of wire $W_1$ is in the path of the jaw 160 and, accordingly, it is engaged thereby and brought into clamping engagement with the fixed clamp jaw 140a, whereupon the section of wire $W_1$ is pulled over toward the fixed clamp jaw 140a into the position illustrated by lines $W_2$ in FIG. 29.

Figure 30:
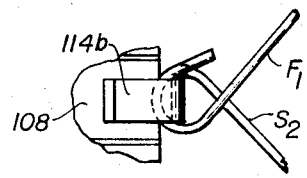
FIG. 30 is a view similar to FIG. 26 but illustrating a commutator tang after the cutting of the finish wire therefrom.
Figure 29:
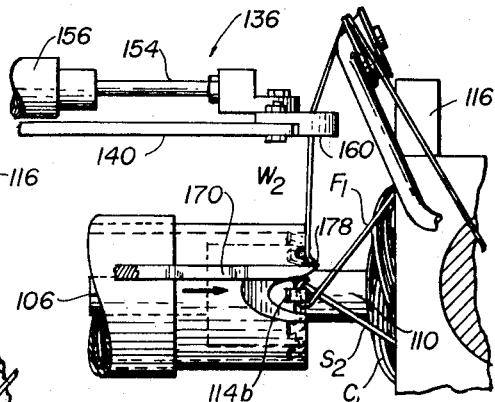
FIG. 29 is a side elevational view showing the same parts illustrated in FIG. 28 at the time of the cutting of the finish wire.

The portion of the section of wire $W_2$ located between the tang 114b and the clamp jaws lies in a plane approximately perpendicular to the armature shaft 106 and against the rear face of the tang 114b and is sufficiently taut that it can conveniently be cut upon extension of the cutter rod 170 in the manner illustrated in FIG. 29. Immediately after the wire is cut the cutter rod 170 is again retracted. Since the other finish wire is simultaneously cut adjacent the tang 114a by the other cutter device (not shown) the wound armature is cut completely free from the fliers 124 and it can be removed. FIG. 30 shows an enlarged view of the tang 114b with both the start wire $S_2$ and the finish wire $F_1$ looped thereabout. When the finish wire $F_1$ is cut, the beveled face of the cutter rod 170 tends to cam the cut end further about the tang 114b toward the armature core and the armature shaft. Since no further tension will be placed upon the finish wires after the cutting thereof, a full looping of the finish wires about the tangs 114a and 114b, as was done with the start wires, is unnecessary.

A comparison of FIG. 29 with FIGS. 18 and 19 reveals that the parts of the armature winding machine used in forming the coils and the start and finish wires are properly positioned at the time a wound armature is cut free for accommodating a new, unwound armature, the only difference in position between the parts as illustrated in FIG. 29 and as illustrated in FIG. 19 being that the movable tang shield 130 has been extended in FIG. 19 after the cutter rod 170 has been retracted. The clamp device 136 remains in the position illustrated in FIG. 29 until it is later moved back to the mid position illustrated in FIG. 24. Thus it can be seen that the apparatus of the second embodiment can be used in the automatic winding of armatures, with the operation described above repeated for each armature.

Figure 31:
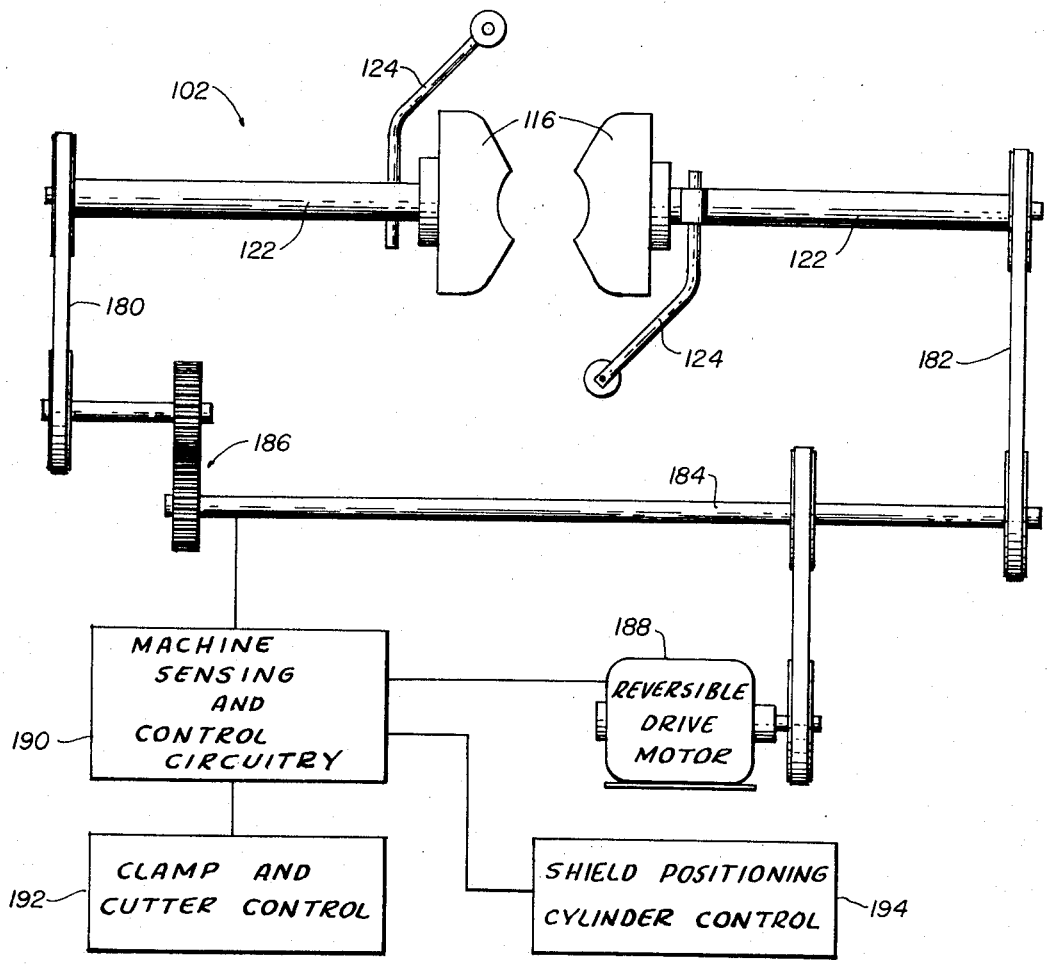
FIG. 31 is a schematic representation of an armature winding machine provided with the apparatus of this invention.

FIG. 31 schematically illustrates the armature winding machine 102 with the flier spindles 122 driven by left and right hand pulleys 180 and 182, respectively. The right hand pulley 182 is directly driven off the cross shaft 184 whereas the left hand pulley 180 is driven through a gear system 186 whereupon the left hand flier spindle 122 is rotated in a direction opposite to the right hand spindle 122. The cross shaft 184 is driven by a reversible drive motor which, as those familiar with the art will understand, is a hydraulic drive on most modern machines. The rotation of the fliers 124 is sensed by cam followers or proximity devices which sense rotation of the cross shaft 184 and/or timing shafts (not shown) driven by the cross shaft 184. The sensing devices control the operation of control circuitry 190 normally including plural relays which in turn control the operation of the reversible drive motor, the clamp and cutter control devices 192 and the shield positioning cylinder controls 194 as indicated by the block diagram portions of FIG. 1. Certain operations of a winding machine have not been described herein such as the movements of the wire guide wings 116 relative to one another for gripping and releasing their grip on the armature 100 when it is inserted or removed and when it is indexed. Mechanisms for indexing or rotating the armatures to appropriately align them with the winding form 116 are not shown because they form no part of the invention. Also those familiar with the art will understand that other sensing devices, such as limit switches, will be used in the machine sensing and control circuitry to provide the proper operating sequence for carrying out the winding of the armature and the looping or hooking and the cutting away of the start and finish wires as described above. Control circuitry adequate for this purpose is well known and thus not described in detail herein.

It will be observed that the operation of the second embodiment of the apparatus shown beginning with FIG. 18 is basically the same as the embodiment shown beginning with FIG. 1. However, in the second embodiment the clamp mechanisms are located above and below the armature shaft rather than to the side of the armature shaft, and the second embodiment utilizes pivotal clamp jaws to engage the wires leading to the fliers whereas in the first embodiment the wires are draped over the abutments by rotation of the fliers. In both cases means are provided for clamping the start and finish wires adjacent the tangs while the armatures are located at the winding station between the winding forms with the wire sections directed to the fliers lying in planes approximately perpendicular to the armature shaft. Also, in both embodiments means are provided to cut the start and finish wires free from the fliers before removal of the armature from the winding station. The second embodiment is presently preferred primarily because the location of the clamp and cutter devices above and below the shaft leaves more room for transfer mechanisms and supplementary wire guides or the like (not shown).

Although the presently preferred embodiments of this invention have been described, it will be understood that within the purview of this invention various changes may be made within the scope of the appended claims.

Having thus described my invention, I claim:

1. In a method of automatically winding armatures wherein armatures are wound and lead wire connections are formed at a winding station and a wound armature is removed from the winding station and replaced by an unwound armature, the method of handling a wire used in winding the armatures at the termination of the winding of the wound armature and the start of the winding of the unwound armature comprising the steps of hooking the wire about a commutator tang adjacent the wound armature, clamping the wire immediately adjacent said tang, cutting the wire between the tang and the portion thereof which is clamped, removing the wound armature and replacing it at the winding station by the unwound armature, looping the wire completely around a commutator tang of the unwound armature while maintaining the wire clamped, and cutting the wire between the last mentioned tang and the portion thereof which is clamped.

2. The method of claim 1 wherein the wire is first cut by a cutter advancing toward the core of the wound armature, the movement of the cutter during and after the cutting of the wire causing the wire to be bent toward the armature core partially around said first mentioned tang.

3. The method of claim 1 wherein the wire is cut the second mentioned time by a cutter moving away from the core of the unwound armature, such movement of the cutter causing the wire to be bent away from the armature core partially around the tang of the unwound armature.

4. The method of claim 1 wherein the wire is hooked to the first mentioned tang by rotating a flier used in winding coils in the armature in a direction opposite to the direction of movement of the flier when winding coils.

5. The method of claim 4 wherein an abutment is placed adjacent the first mentioned tang after the wire is hooked thereto, and the flier is then rotated in the same direction of movement when winding coils to extend the wire over a surface of the abutment, and wherein the wire is clamped to said surface of the abutment.

6. The method of claim 1 wherein the wire adjacent the first mentioned tang is engaged by movable clamp means after the wire is hooked thereto, and the wire is drawn by said movable clamp means to a fixed clamp means.

7. The method of claim 1 wherein the wire is looped about the last mentioned tang by rotating a flier used in winding coils in the armature in a first direction which is opposite to the direction of movement of the flier when winding coils, thereby to hook the wire about the rear face of the last mentioned tang, and then rotating the flier in the same direction of movement when winding coils while preventing the wire from becoming unhooked, thereby causing it to bend around the front of the last mentioned tang.

8. The method of claim 7 wherein the wire is prevented from becoming unhooked by moving a tang shield into covering relation to the last mentioned tang, the tang shield having a surface confronting and spaced from the armature core along which the wire is guided over the front of the last mentioned tang.

9. The method of claim 8 wherein the shield is movable axially of the armature shaft to shield and expose the tangs, the shield being advanced toward the core to shield the last mentioned tang.

10. The method of claim 8 wherein the shield has at least one notch in the surface thereof confronting the core, the shield being mounted for rotation about the axis of the armature shaft, and wherein the shield is rotated to move it into shielding relation to the tang.

11. In a method of automatically winding armatures of the type having a slotted armature core and a commutator mounted upon an armature shaft, the end of said commutator confronting the armature core having as many wire lead receiving tangs as there are coils, said tangs having a front surface generally facing toward said armature core and a rear surface generally facing away from said armature core, the method being of the type wherein such armatures are wound and lead wire connections are formed at a winding station and a wound armature is removed from the winding station and replaced by an unwound armature, the winding of coils in the armature slots being done by a pair of rotating fliers with each of which is associated a wire strand used in forming the coils and the lead wire connections for a plurality of successively wound armatures, the method of cutting the wire strands between a wound armature and an unwound armature comprising the steps of hooking said wire strands about the rear faces of a pair of spaced commutator tangs associated with the wound armature, clamping both of said wire strands adjacent said tangs, severing said wire strands between the points where said wires are clamped and said tangs, maintaining the clamping of said wire strands as the wound armature is removed and replaced by an unwound armature, wrapping said wire strands about a pair of commutator tangs of the unwound armature in preparation for the winding of coils in slots of said unwound armature, and again cutting said wire strands between the clamped portions thereof and said last mentioned pair of commutator tangs.

12. In a method for successively winding armatures with the use of an armature winding machine of the type having at least one rotating flier for laying wire into pairs of armature slots to form coils therein, the flier and the armatures being manipulated as required to form coils in successive pairs of slots and to hook wire leads about commutator tangs between the winding of coils in an armature, a wound armature being removed from the armature winding machine after the winding thereof is complete and replaced by an unwound armature, the method of handling the wire between the winding of armatures including the steps of stopping the flier adjacent a commutator tang at a first position after the winding of the last of the coils to be wound by the flier in an armature, hooking the wire about the last mentioned tang by rotating the flier to a second position in a direction opposite to the direction it rotates when winding coils, placing an abutment adjacent the tang and rotating the flier in the same direction it is rotated when winding coils back to approximately the first position to extend the wire over a surface of the abutment, clamping the wire to the surface of the abutment, cutting the wire between the tang and the portion thereof clamped to the abutment, removing the wound armature from the winding machine and replacing it by an unwound armature, positioning the abutment with the wire clamped thereto between the commutator and the core of the unwound armature with the wire between the abutment and the flier extending across the front of a commutator tang, rotating the flier in the said opposite direction back to approximately the second position to hook the wire about the last mentioned tang, again rotating the flier in the same direction as it is rotated when winding coils while guiding the wire over the front of the tang, whereupon the wire is completely looped about the last mentioned tang, and cutting the wire between the portion thereof clamped to the abutment and the last mentioned tang.

13. In the winding of an armature of the type having a slotted armature core and a commutator with tangs on the end thereof confronting said core, each of said tangs having a front surface facing the core and a rear surface facing away from the core with an armature winding machine of the type having at least one rotating flier for laying wire into pairs of armature slots to form coils therein, the method of handling the wire used in winding the armature at the beginning of the winding, the wire being the front adjacent its free end at a predetermined location adjacent the armature and extending to the flier from said location across the front face of a preselected tang about which a start wire is to be connected, said method including the steps of rotating the flier in a direction to cause the wire to be hooked to said tang while maintaining the wire clamped, the wire extending from said location across the front face of said tang and across the rear face of said tang to said flier, placing shield means adjacent said tang effective to guide the wire over the front face of said tang when said flier is rotated in a direction opposite to said first mentioned direction, and rotating said flier in a direction opposite to said first mentioned direction while retaining said shield means over said tang whereupon the wire is caused to be extended over the front face of said tang, the wire thus being completely looped about said tang.

14. The method of claim 13 further including the step of cutting the wire between the clamped end thereof and the tang by cutter means moving in a direction to cause the cut end of the wire to be bent around said tang.

15. The method of claim 14 wherein said cutter means is moved in a direction substantially normal to the armature shaft.

16. The method of claim 14 wherein the cutter means is moved in a direction substantially parallel to the armature shaft and away from the armature core.

17. The method of claim 13 wherein said shield means is mounted for movement axially of the armature shaft, said shield means being placed adjacent said tang by moving it axially toward the armature core and over said tang.

18. The method of claim 13 wherein said shield means surrounds the commutator and is mounted for rotation about the axis of the armature shaft, said shield means having a forward edge confronting the armature core with at least one notch therein for exposing said tang, said shield means being placed adjacent said tang by rotating it to move said notch away from said tang.

19. In the winding of an armature of the type having a slotted armature core and a commutator with tangs on the end thereof confronting the armature core, each of the tangs having a front surface facing the armature core and a rear surface facing away from the armature core, the method of attaching the finish wire leading from a coil wound in a pair of slots in the core to a preselected one of the tangs and severing the finish wire between the tang and a flier used in winding the coil while maintaining control of the wire at all times comprising the steps of stopping the rotation of the flier at the end of the winding of the coil at a first stop position, rotating said flier in a direction opposite to the direction in which it was rotated to wind the coil to thereby extend the wire across the rear face of said tang, positioning an abutment between said tang and the free end of the flier and on the side of said tang opposite from said core, rotating said flier back to approximately said first stop position to thereby extend said wire over said abutment, clamping the wire to said abutment in preparation for the cutting of the wire adjacent said tang, severing said wire by cutter means, and extending the cut end of the portion of wire severed from the flier partially around said tang.

20. In the winding of an armature of the type having a slotted armature core and a commutator with tangs on the end thereof confronting the armature core, each of the tangs having a front surface facing the armature core and a rear surface facing away from the armature core, the method of attaching the finish wire leading from a coil wound in a pair of slots in the core to a preselected one of the tangs and severing the finish wire between the tang and a flier used in winding the coil while maintaining control of the wire at all times comprising the steps of stopping the rotation of the flier at the end of the winding of the coil at a first stop position, rotating said flier in a direction opposite to the direction in which it was rotated to wind the coil to thereby extend the wire across the rear face of said tang, positioning an abutment between said tang and the free end of the flier and on the side of said tang opposite from said core, rotating said flier back to approximately said first stop position to thereby extend said wire over said abutment, and clamping the wire to said abutment in preparation for the cutting of the wire adjacent said tang, and severing said wire by cutter means, said cutter means being moved in a direction to cause the cut end of the wire to be bent around said tang after being clamped to said abutment.

21. The method of claim 19 wherein said cutter means is moved in a direction substantially normal to the armature shaft after said wire is clamped to said abutment.

22. The method of claim 19 wherein said cutter means is moved in a direction substantially parallel to the armature shaft and toward the armature core after said wire is clamped to said abutment.

23. In the winding of an armature of the type having a slotted armature core and a commutator with tangs on the end thereof confronting the armature core, each of the tangs having a front surface facing the armature core and a rear surface facing away from the armature core, the method of attaching the finish wire leading from a coil wound in a pair of slots in the core to a preselected one of the tangs and severing the finish wire between the tang and a flier used in winding the coil while maintaining control of the wire at all times comprising the steps of stopping the rotation of the flier at the end of the winding of the coil at a first stop position, rotating said flier in a direction opposite to the direction in which it was rotated to wind the coil to thereby extend the wire across the rear face of said tang, clamping the wire between said tang and the flier in preparation for the cutting of the wire adjacent said tang, severing said wire by cutter means, and bending the cut end of the wire severed from said flier partially around said tang, all of the foregoing steps being conducted prior to removing said flier from the position it occupies during the winding of the coils by said flier.

24. The method of claim 23 wherein the wire is clamped by engaging a portion thereof by movable means and moving said movable means and the wire into engagement with a relatively fixed member, the wire thereby being brought into position for engagement by said cutter means.

25. The method of claim 23 wherein the step of clamping the wire is accomplished by moving an abutment adjacent to the wire between said tang and the flier, rotating the flier to extend the wire over said abutment and clamping the wire to said abutment.

26. The method of claim 23 wherein said cutter means includes a cutter rod having a knife edge for cutting said wire and wherein said rod is moved from a position remote from the armature toward said armature to sever the wire.

* * * * *

UNITED STATES PATENT OFFICE
CERTIFICATE OF CORRECTION

Patent No. 3,713,209   Dated January 30, 1973

Inventor(s)   John M. Biddison

It is certified that error appears in the above-identified patent and that said Letters Patent are hereby corrected as shown below:

Column 4, line 41, "which" should be ---with---
Column 5, line 30, "constituted" should be ---constitutes---
Column 5, line 33, "exposed" should be ---expose---
Column 6, line 51, after "mechanism" insert ---is---
Column 10, line 3, after "above" insert ---and---
Column 11, line 20, "aubstantially" should be ---substantially---
Column 11, line 26, "tanks" should be ---tangs---
Column 15, line 32, after "their" insert ---reverse---
Column 19, line 50, delete "the front", insert ---clamped--- after "being"

Signed and sealed this 29th day of May 1973.

(SEAL)
Attest:

EDWARD M. FLETCHER, JR.　　　　　ROBERT GOTTSCHALK
Attesting Officer　　　　　　　　Commissioner of Patents Notice of Adverse Decision in Interference In Interference No. 98,353, involving Patent No. 3,713,209, J. M. Biddison, AUTOMATIC ARMATURE WINDING, final judgment adverse to the patentee was rendered Mar. 3, 1975, as to claims 1, 4, 6, 7, 8, 9, 11, 13, 16 and 17.

[*Official Gazette July 8, 1975.*]